Dec. 8, 1964   R. ORSINI   3,159,877
MACHINES FOR THE EXTRUSION OF CASINGS, CONDUITS OR SHAPED
SECTIONAL MEMBERS OF REINFORCED MATERIAL
Filed Nov. 5, 1962   2 Sheets-Sheet 1
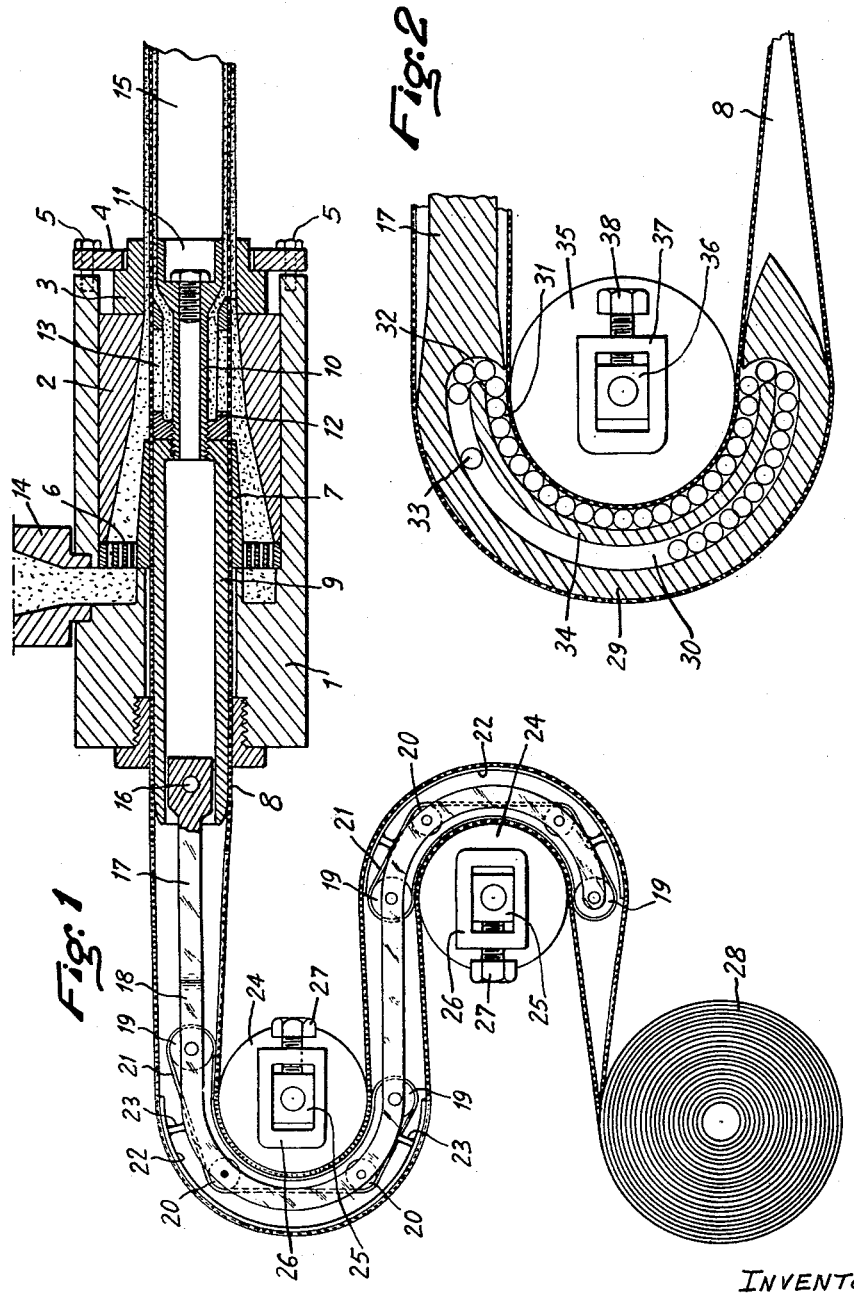
INVENTOR
RENÉ ORSINI
BY Irvin S. Thompson
ATTORNEY

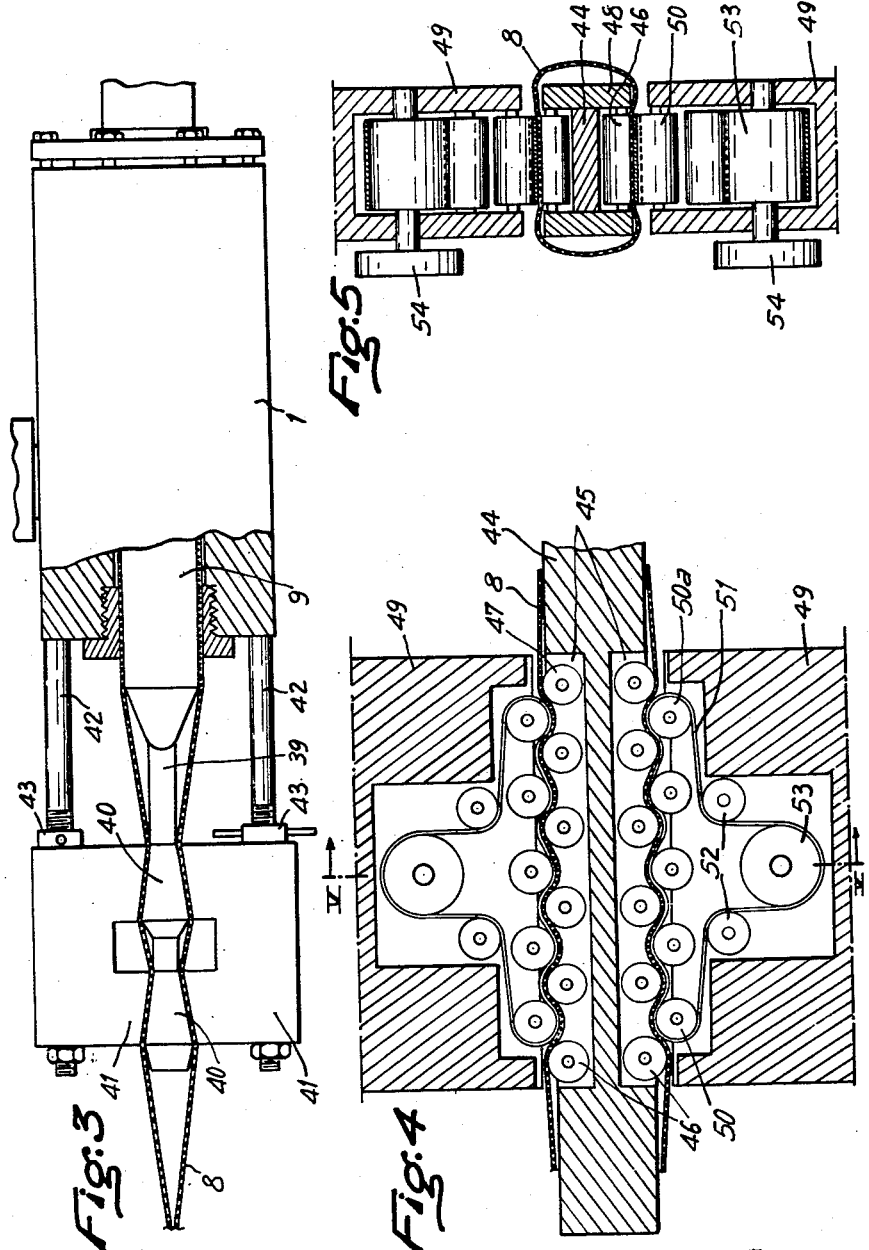

United States Patent Office 3,159,877
Patented Dec. 8, 1964

3,159,877
MACHINES FOR THE EXTRUSION OF CASINGS, CONDUITS OR SHAPED SECTIONAL MEMBERS OF REINFORCED MATERIAL
René Orsini, Geneva, Switzerland, assignor to Societe Anonyme Plastus S.A., Geneva, Switzerland, a corporation of Switzerland
Filed Nov. 5, 1962, Ser. No. 235,210
6 Claims. (Cl. 18—13)

The present invention relates to machines for the extrusion of casings, conduits, or shaped sectional members, of reinforced material, plastic or otherwise. In these machines the reinforcement of the casing constituded by a tube or sheath of woven textile fabric or metal wire, must be inserted by its rear part into the extruder and pass around the guiding and calibrating mandrel located in the axis of the extruder.

It is necessary, in these machines, to hold the mandrel thus disposed in the casing, which mandrel is subjected to a considerable force tending to drive it forwards, which force is due to the friction of the extruded material.

To solve this problem the only solution known up to the present consists in extending the mandrel rearwardly by a rigid tail or prolongation around which the reinforcing sheath passes, and in providing at least two sets of spaced apart clamping members or jaws which clamp alternately the said prolongation and the sheath, a length of sheath, at least equal to twice the length of tube extruded in the same time, being passed during the opening of each set of jaws, from the upstream to the downstream of each set and stored in the folded state.

Such a device requires a manual operation to pass the sheath from upstream to down stream of the jaws and is useless with sheaths of metallic wire which can only be folded with difficulty for storage.

The present invention has for its object to overcome these drawbacks by avoiding manual operation for advancement of the sheath and permitting feeding with a relatively rigid sheath.

According to the invention, the mandrel is extended by a tail at least one of the surfaces of which forms an angle with the longitudinal direction of the mandrel, this surface bearing against an exterior supporting surface which holds in longitudinal position the surface forming an angle of the tail, the sheath passing between the said two surfaces and its forward movement preferably being facilitated by a rolling contact with at least the surface of the tail.

According to a first embodiment, the tail of the mandrel forms an arc equal to or greater than 90° so as to constitute a hook co-operating with a supporting surface constituted by a cylinder. In such an arrangement the part of the tail of the mandrel coming in contact with the surface of the cylinder is preferably provided with cylinders, endless bands, or rolling devices which include rollers, to avoid friction of the sheath on the tail, the supporting cylinder preferably being rotated to ensure the forward movement of the sheath.

The supporting cylinder is, preferably, mounted in trunnions of which the longitudinal position with respect to the extruder is adjustable to effect the adjustment of the mandrel in the extruder and to facilitate the positioning of the sheath on to the retaining device.

According to a second embodiment, the tail of the mandrel has pyramidal or angled surfaces, two opposed faces of which are disposed against the faces of the two blocking jaws of complementary shape. The surfaces of contact between the sheath and the pyramidal or angled surface of the tail of the mandrel, on the one hand, and the retaining jaw, on the other hand, are preferably provided with rolling surfaces.

According to a third embodiment, the tail of the mandrel is provided with rollers on two opposed faces and with these rollers co-operate rollers carried by retaining jaws, the rollers of the retaining jaws engaging partially between the rollers of the mandrel tail, with the sheath between them, so as to obtain a longitudinal component for the contact pressure between rollers.

According to an improvement of this third embodiment, an endless band passes between the rollers of the retaining jaw and the sheath, and the endless bands of the two opposed jaws are positively driven to ensure the forward movement of the sheath.

There will be described hereafter various embodiments of machines according to the invention for the extrusion of casings of reinforced material, with reference to the accompanying drawings in which:

FIG. 1 is a longitudinal sectional view of an extruder and of a retaining device for positioning the mandrel of the extruder in both longitudinal directions;

FIG. 2 is a modification of the device of FIG. 1 with the retaining device acting in one longitudinal direction only;

FIG. 3 is a diagrammatic view of a device with angled surfaces on the tail of the mandrel;

FIG. 4 is a detail view of the tail of the mandrel and of the retaining jaw in the case of a supporting device operating by rollers, and FIG. 5 is a view in section along V—V, FIG. 4.

The extruder is of any known type and comprises a body 1 in which is mounted a nozzle 2 the section of which decreases towards the outlet and which opens into a die 3 held at the end of the body by a clamping ring 4 held in position by screws 5. At its inner end the nozzle 2 abuts a perforated plate 6 which positions a cylindrical central core 7. On the interior of the core the body 9 of the mandrel can move longitudinally with a clearance just sufficient for the passage of the reinforcing sheath 8. The body 9 carries by means of a rod 10, the mandrel proper 11 located at the centre of the die 3 and which determines the thickness of the extruded plastic casing. Between the body 9 and the mandrel 11, around the rod 10, the sheath 8 is supported by a cylindrical member 12 having slots 13 and terminating at the front to leave a clearance with the mandrel to permit the plastic material, injected through the head 14, which has passed the perforated plate 6, to enter the nozzle 2 to pass through the material of the reinforcing sheath, to penetrate to the space around the rod 10 and to feed the zone between the mandrel 11 and the sheath 8 so as to form, with the plastic material which passes through the die 3, the reinforced plastic casing 15.

Such extruders are known and have been previously described.

In order to maintain the body 9 of the mandrel in place so that the mandrel proper 11 is located in the terminal portion of the die 3, and according to the invention, the body 9 is made in one, by a connector 16, with a tail 17. The said tail 17 is constituted in the embodiment by a rod which is divided to form two parallel strips 18 curved into the form of an S in the radial vertical plane of the die. Between these strips are mounted, at two substantially diametrically opposite points of each hook of the S, cylinders 19. The said strips carry in addition, between each pair of cylinders 19, guiding cylinders 20. An endless band 21 passes around the cylinders 19 and on the exterior of the cylinders 20. Between each pair of cylinders 19 and on the exterior of the loop, guiding plate 22 are provided, made integral with the strips 18 by supports 23. The dimensions of the tail are such that the sheath held formed with a substantially square section can pass on the exterior of the guiding plate 22 and of the band 21 supported by the cylinders 19. In such hook of the tail is mounted a cylinder 24 carried by trunnions 25 slidably mounted in their bearings 26 and subjected to the action of a regulating screw 27 which tends to force the cylinder into the associated loop of the S.

It will be understood that the sheath 8 supplied from a feed roller 28, can be threaded onto the tail, its flexibility in all cases being sufficient to follow the formations of the S of the tail; the radius of curvature may moreover be modified according to particular requirements by modifying the radius of curvature of the said hooks and of the corresponding cylinders 24. When the thus threaded sheath is inserted into the extruder, the position of the mandrel can be adjusted by clamping and unclamping respectively the screws 27 which act in opposite directions and ensure the longitudinal movement of the mandrel in both directions. The traction effort exerted on the mandrel is imparted by the rollers 19 and the endless band 21 over all the surface of the sheath held between said band and the cylinder 24. No hold-up can take place since the cylinders 24 can be driven in rotation.

In the embodiment of FIG. 2 the tail 17 forms a body 29 of semi-circular hook shape, the section of which is such that it can be engaged in the sheath with a slight clearance. In the inner part of this body 29 is formed a cage constituted by two semi-circular runways, one exterior 30 and the other interior 31, the runway 31 being open towards the interior of the hook. These two runways are connected by arc-shaped inclines 32 and in the continuous cage thus formed are placed small cylinders 33 forming needles the diameter of which is such that they pass freely in the incline 32 and project slightly with respect to the inner edge of the body 29 when they are supported on the face of the partition 34 limiting the sector 31 of the cage. A cylinder 35 is mounted by trunnions 36 on the interior of the hook 29, these trunnions themselves being mounted to slide in a support 37 and subjected to the action of a regulating thrust screw 38 acting parallel to the axis of the tail 17 in a direction opposed to the pull of the mandrel on this tail. The sheath 8 is threaded between the cylinder 35 and the body 29 of the tail 17 and is gripped between the rollers 33 and the cylinder 35.

During the operation the cylinder 35 can be positively driven to cause the sheath to be moved forward by the surface in contact, which causes the cylinders 33 to roll in the ascending direction against the inner face of the partition 34. On arrival at the summit of the cage the cylinders 33 can fall back by their own weight, being guided by the part 30 of the cage.

In the embodiment of FIG. 3, the body 9 of the mandrel is extended by a tail 39 which has two enlargements 40, these enlargements being of pyramidal or angle shape so that their maximum section can fit the interior of the sheath. On the exterior, two pairs of positioning abutments 41 are provided, the abutments of each pair co-operating with opposite faces of the angle enlargements 40. The positioning abutments 41 are kept in position by pillars 42 provided with regulating means, for example tapped rings 43 co-operating with screw-threads on said pillars to adjust the position of the jaws 41 with respect to the body of the die. The sheath 8 passes at the periphery of the angle enlargements 40 between these latter and the positioning abutments 41.

To avoid friction and binding of the sheath, the bearing surfaces of the angle enlargements 40 and of the abutments 41 are provided with rolling members, endless bands or the like.

According to another embodiment shown in FIGS. 4 and 5 the tail 44 which prolongs the body 9 of the mandrel has a rectangular section less than the section of the sheath 8 and it has on two opposed faces recesses 45. In these recesses are housed cylinders 46 and 47 which are kept in place and rotatably mounted in lateral walls 48. These cylinders project slightly above the corresponding lateral faces of the tail 44 and the sections of the said tail and of the lateral walls are such, with respect to the peripherical development of the sheath, that this latter can be threaded on to the assembly.

The positioning jaws 49 carry, on their face opposite the recesses 45 of the mandrel tail, a series of cylinders 50 rotatably mounted and the spacing of which is such that they bear according to a generatrix on the cylinders 46 of the tail 44, the cylinder 50a bearing both on a generatrix of the cylinder 46 and on a generatrix of the cylinder 47 to avoid the rearward movement of the mandrel. Besides and preferably, over the cylinders 50 and 50a passes an endless band 51 which, by return rollers 52, is passed to a cylinder 53 which is integral with a toothed wheel or a pulley 54, permitting the positive drive of the band.

When the cylinders 50 of the positioning jaws 49 are bearing on the cylinders 46–47 of the tail 44, the planes passing through the axes of the cylinders 46 and 50 have an inclination of about 45° to the longitudinal plane so as to obtain a large longitudinal component of the forces with respect to the gripping between the positioning jaws, without subjecting the sheath to a too great undulating formation.

The embodiments described above by way of example may receive numerous modifications without departing from the scope of the present invention.

What I claim is:

1. A machine for the extrusion of shaped sectional members of plastic material having a reinforcing sleeve embedded in a thermoplastic material comprising an extrusion head having a longitudinal bore, a mandrel mounted within said bore with a clearance between said mandrel and said bore for the reception of said sleeve, a die in the front of said bore with a clearance between said die and said bore for the reception of said sleeve, means connecting said die to the front of said mandrel, a bar carried by the rear end of said mandrel, a hook shaped part in said bar, rolling means on the inside of said hook shaped part, said bar, hook shaped part and rolling means being adapted to be enveloped by said reinforcing sleeve, a cylinder the radius of which is substantially equal to the radius of the inside of said hook shaped part and cooperating with the said rolling means of the shaped part for supporting said bar.

2. A machine for the extrusion of shaped sectional members as claimed in claim 1 in which the cylinder is positively driven.

3. A machine for the extrusion of shaped sectional members of plastic material having a reinforcing sleeve embedded in a thermoplastic material comprising an extrusion head having a longitudinal bore, a mandrel mounted within said bore with a clearance between said mandrel and said bore for the reception of said sleeve, a die in the front of said bore with a clearance between said die and said bore for the reception of said sleeve, means connecting said die to the front of said mandrel, a bar carried by the rear end of said mandrel, a S shaped part in said bar, rolling means on the inside of both hook shaped portions of said S shaped part, said bar, S shaped part and rolling means being adapted to be enveloped by said reinforcing sleeve, two cylinders the radius of which is substantially equal to the radius of the inside of the hook shaped portions and cooperating each with the said rolling means of each hook shaped portion for supporting said bar.

4. A machine for the extrusion of shaped sectional members as claimed in claim 3 in which the cylinders are positively driven.

5. A machine for the extrusion of shaped sectional members of plastic material having a reinforcing sleeve embedded in a thermoplastic material comprising an extrusion head having a longitudinal bore, a mandrel mounted within said bore with a clearance between said mandrel and said bore for the reception of said sleeve, a die in the front of said bore with a clearance between said die and said bore for the reception of said sleeve, means connecting said die to the front of said mandrel, a bar carried by the rear end of said mandrel, at least one hook shaped part in said bar, rolling means on the inside of each hook shaped part, said bar, hook shaped part and rolling means being adapted to be enveloped by said reinforcing sleeve, and rolling means external to said reinforcing sleeve and cooperating with the rolling means on the inside of each hook shaped part for supporting said bar.

6. A machine for the extrusion of shaped sectional members of plastic material having a reinforcing sleeve embedded in a thermoplastic material comprising an extrusion head having a longitudinal bore, a mandrel mounted within said bore with a clearance between said mandrel and said bore for the reception of said sleeve, a die in the front of said bore with a clearance between said die and said bore for the reception of said sleeve, means connecting said die to the front of said mandrel, a bar carried by the rear end of said mandrel, at least one hook shaped part in said bar, rolling means on the inside of each hook shaped part, said bar, hook shaped part and rolling means being adapted to be enveloped by said reinforcing sleeve, and a cylinder the radius of which is substantially equal to the radius of the inside of said hook shaped part and cooperating with the said rolling means of the inside of each hook shaped part for supporting said bar.

References Cited by the Examiner

UNITED STATES PATENTS

| | | | |
|---|---|---|---|
| 1,548,505 | 8/25 | Becker | 18—13 |
| 2,418,974 | 4/47 | Henry | 18—10 |
| 2,600,254 | 6/52 | Lysobey | 18—13 |
| 2,767,431 | 10/56 | De Laubarede | 18—13 |
| 2,990,577 | 7/61 | Kraffe De Laubarede | 18—14 |

FOREIGN PATENTS

| | | |
|---|---|---|
| 15,953 | 8/05 | Great Britain. |

MICHAEL V. BRINDISI, *Primary Examiner.*

WILLIAM J. STEPHENSON, *Examiner.*